(12) United States Patent
Toennies

(10) Patent No.: US 11,674,535 B2
(45) Date of Patent: Jun. 13, 2023

(54) HYDRAULIC SYSTEM HAVING A DRAIN BYPASS

(71) Applicant: CNH Industrial America LLC, New Holland, PA (US)

(72) Inventor: Heath A. Toennies, Eureka, IL (US)

(73) Assignee: CNH Industrial America LLC, New Holland, PA (US)

( * ) Notice: Subject to any disclaimer, the term of this patent is extended or adjusted under 35 U.S.C. 154(b) by 58 days.

(21) Appl. No.: 17/330,617

(22) Filed: May 26, 2021

(65) Prior Publication Data

US 2021/0372439 A1    Dec. 2, 2021

Related U.S. Application Data

(60) Provisional application No. 63/032,282, filed on May 29, 2020.

(51) Int. Cl.

| | |
|---|---|
| *F15B 13/02* | (2006.01) |
| *A01B 61/04* | (2006.01) |
| *F15B 20/00* | (2006.01) |
| *A01B 63/32* | (2006.01) |
| *F15B 13/04* | (2006.01) |

(52) U.S. Cl.
CPC ........ *F15B 13/0401* (2013.01); *A01B 61/044* (2013.01); *A01B 61/046* (2013.01); *F15B 13/024* (2013.01); *F15B 13/025* (2013.01); *F15B 13/027* (2013.01);

(Continued)

(58) Field of Classification Search
CPC ..... A01B 61/044; A01B 61/046; A01B 63/32; F15B 13/024; F15B 20/007; F15B 2211/45
See application file for complete search history.

(56) References Cited

U.S. PATENT DOCUMENTS

| | | |
|---|---|---|
| 3,602,243 A | 8/1971 | Holt et al. |
| 6,170,412 B1 * | 1/2001 | Memory ................. F15B 11/17 180/53.61 |

(Continued)

OTHER PUBLICATIONS

Great Plains, "Power Beyond Connections for Great Plains 3PYP Planters Equipped with Hydraulic Steering," 22 pgs, 2011, https://www.greatplainsag.com/manuals/pdf/pbcg.pdf.

(Continued)

*Primary Examiner* — Kenneth Bomberg
*Assistant Examiner* — Matthew Wiblin
(74) *Attorney, Agent, or Firm* — Rebecca Henkel; Rickard DeMille

(57) ABSTRACT

A hydraulic system including a first cylinder conduit configured to couple to a cylinder, an auxiliary conduit configured to couple to a case drain conduit, and a pressure regulator coupled to the first cylinder conduit and to the auxiliary conduit. The pressure regulator may block fluid flow to the auxiliary conduit if a first fluid pressure is less than or equal to a threshold pressure and enable fluid flow if the first fluid pressure is greater than the threshold pressure. The hydraulic system further includes a supplemental conduit with a check valve that directs fluid from the auxiliary conduit to a reservoir. The check valve blocks fluid flow if a second fluid pressure is less than or equal to a third fluid pressure, and enables fluid flow if the second fluid pressure greater than the third fluid pressure.

19 Claims, 4 Drawing Sheets

(52) U.S. Cl.
CPC ............ *F15B 20/007* (2013.01); *A01B 63/32* (2013.01); *F15B 2211/255* (2013.01); *F15B 2211/45* (2013.01)

(56) References Cited

U.S. PATENT DOCUMENTS

| | | | |
|---|---|---|---|
| 6,293,354 B1 * | 9/2001 | Garratt | E02F 3/783 |
| | | | 172/664 |
| 6,378,619 B2 * | 4/2002 | Mayerle | A01B 63/11 |
| | | | 172/459 |
| 6,606,956 B1 * | 8/2003 | Paluch | A01C 7/208 |
| | | | 111/200 |
| 6,662,556 B2 | 12/2003 | Bares et al. | |
| 7,918,285 B1 | 4/2011 | Graham et al. | |
| 8,056,465 B2 * | 11/2011 | Carlz | A01C 7/205 |
| | | | 91/420 |
| 8,573,111 B2 | 11/2013 | Graham et al. | |
| 10,156,246 B2 | 12/2018 | Coolidge | |
| 10,321,621 B2 | 6/2019 | Barfels | |
| 10,349,571 B2 | 7/2019 | Fink et al. | |
| 2003/0164125 A1 * | 9/2003 | Paluch | A01C 7/06 |
| | | | 172/261 |
| 2012/0151909 A1 | 6/2012 | Hacker | |
| 2017/0013771 A1 * | 1/2017 | Townsend | A01C 7/205 |
| 2020/0390018 A1 * | 12/2020 | Smith | A01B 61/046 |

OTHER PUBLICATIONS

Prince Valves, Prince Manufacturing Corporation, North Sioux City, South Dakota, 90 pgs, 2015, http://www.princehyd.com/mobileservices/princeWebServices.asmx/FetchLiterature?fileKey=catalogSect-Valves.

Exactrix Global Systems, Technology at Work, Advanced Technical News for Great Plains Producers, 4 pgs, 2008, https://www.exactrix.com/CPB.htm.

* cited by examiner

HYDRAULIC SYSTEM HAVING A DRAIN BYPASS

CROSS-REFERENCE TO RELATED APPLICATION

This application claims priority from and the benefit of U.S. Provisional Application Ser. No. 63/032,282, entitled "HYDRAULIC SYSTEM HAVING A DRAIN BYPASS", filed May 29, 2020, which is hereby incorporated by reference in its entirety.

BACKGROUND

The present disclosure relates generally to a hydraulic system having a drain bypass.

Certain agricultural implements include ground engaging tools configured to interact with the soil. For example, a tillage implement may include tillage points and/or disc blades configured to break up the soil for subsequent planting or seeding operations. Tillage implements typically include one or more actuators (e.g., hydraulic cylinders) configured to control a penetration depth of the ground engaging tools into the soil. The actuator(s) may also move the ground engaging tools between a lowered/ground engaging position and a raised/transport portion (e.g., to facilitate repositioning the tillage implement between successive rows). Furthermore, certain actuators may control the downforce applied by the ground engaging tools to the soil. The actuator(s) are controlled by a hydraulic system including a series of connections (e.g., hoses, lines, etc.) and valves disposed between the actuator(s) and a hydraulic fluid reservoir. Unfortunately, the full-flow hydraulic return paths on the tractor which are available for use by the agricultural implement vary in backpressure on different tractor makes and models. Sometimes this backpressure is too high to achieve the desired performance from the hydraulic systems on the agricultural implement.

BRIEF DESCRIPTION

In certain embodiments, a hydraulic system includes a first cylinder conduit configured to fluidly coupled to a cylinder, and an auxiliary conduit configured to fluidly couple to a case drain conduit. The hydraulic system may further include a pressure regulator fluidly coupled to the first cylinder conduit and to the auxiliary conduit. The pressure regulator is configured to block fluid flow to the auxiliary conduit while a first fluid pressure within the first cylinder conduit on a cylinder side of the pressure regulator is less than or equal to a threshold pressure. Additionally, the pressure regulator is configured to enable fluid flow to the auxiliary conduit while the first fluid pressure within the first cylinder conduit on the cylinder side of the pressure regulator is greater than the threshold pressure. Moreover, the hydraulic system includes a supplemental conduit configured to direct fluid from the auxiliary conduit to a reservoir, and a check valve disposed along the supplemental conduit. The check valve may block fluid flow through the supplemental conduit to the auxiliary conduit while a second fluid pressure within the supplemental conduit on an auxiliary conduit side of the check valve is less than or equal to a third fluid pressure within the supplemental conduit on a reservoir side of the check valve, and the check valve is configured to enable fluid flow through the supplemental conduit to the reservoir while the second fluid pressure within the supplemental conduit on the auxiliary conduit side of the check valve is greater than the third fluid pressure within the supplemental conduit on the reservoir side of the check valve.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
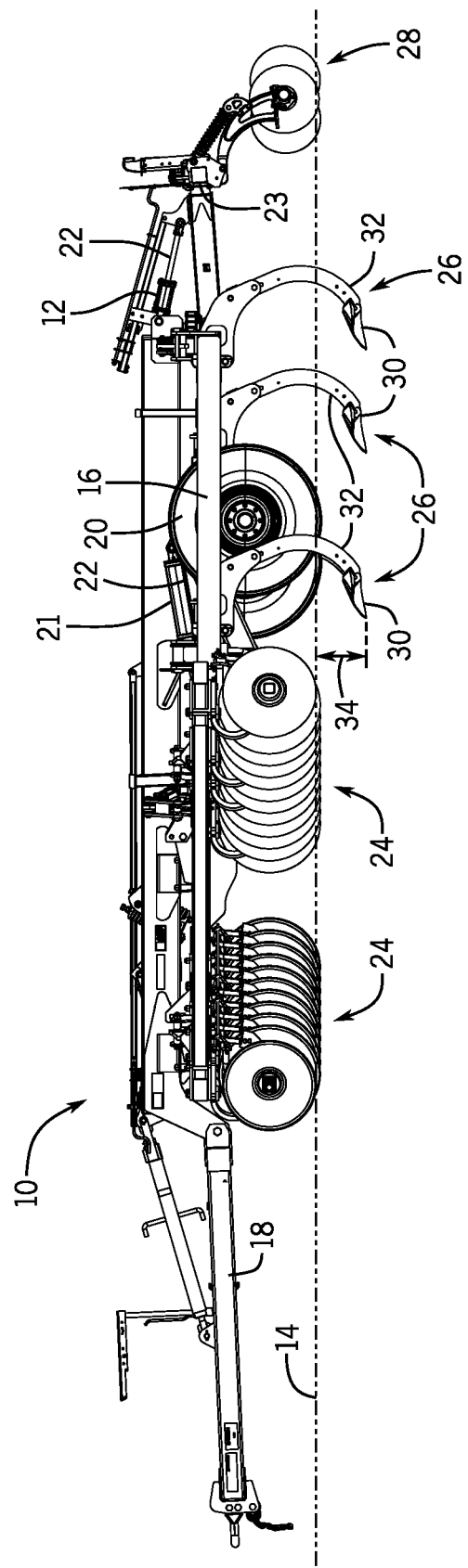
FIG. 1 is a side view of an embodiment of an agricultural implement having actuator(s) controlled by a hydraulic system.

Turning to the drawings, FIG. 1 is a side view of an embodiment of an agricultural implement 10 having actuator(s) controlled by a hydraulic system 12. In the illustrated embodiment, the agricultural implement 10 is a primary tillage implement having multiple ground engaging tools configured to till soil 14. As illustrated, the agricultural implement 10 includes a frame 16 and a hitch assembly 18 coupled to the frame 16. The hitch assembly 18 is configured to couple to a work vehicle (e.g., tractor), and the work vehicle is configured to tow the agricultural implement 10 through a field. In the illustrated embodiment, the agricultural implement 10 includes wheels 20 configured to engage the surface of the soil 14 and to support at least a portion of the agricultural implement 10. In addition, the agricultural implement 10 includes an actuator 21 (e.g., hydraulic cylinder) configured to move the ground engaging tools between the illustrated lowered position to a raised position (e.g., by moving the wheels 20 relative to the frame 16). As the agricultural implement 10 is towed through the field with the ground engaging tools in the lowered position, the ground engaging tools, which are coupled to the frame 16, may break up the soil for subsequent planting or seeding operations. The actuator 21 may lift the ground engaging tools from the lowered position to the raised position. As a result, the ground engaging tools disengage the soil 14 to facilitate transport of the agricultural implement 10 (e.g., between successive rows of the field). In addition, the actuator 21 may lower the ground engaging tools to the lowered position to engage the soil 14.

In the illustrated embodiment, the agricultural implement 10 includes disc blades 24, tillage point assemblies 26, and leveling discs 28. The disc blades 24 are configured to engage a top layer of the soil. As the agricultural implement 10 is towed through the field, the disc blades 24 are driven to rotate, thereby breaking up the top layer and sizing residue on the surface of the field. In the illustrated embodiment, the disc blades 24 are arranged in two rows. However, in alternative embodiments, the disc blades may be arranged in more or fewer rows (e.g., 1, 2, 3, 4, 5, 6, or more). In addition, the angle of each row may be selected to control the interaction of the disc blades 24 with the top layer of soil. The tillage point assemblies 26 are configured to engage the soil at a greater depth, thereby breaking up a lower layer of the soil 14. In the illustrated embodiment, each tillage point assembly 26 includes a tillage point 30 and a shank 32. The shank 32 is configured to position the tillage point 30 at a target depth 34 beneath the soil surface, and the tillage point 30 is configured to break up the soil 14. The shape of each tillage point, the arrangement of the tillage point assemblies, and the number of tillage point assemblies may be selected to control tillage within the field. Furthermore, as the agricultural implement 10 is towed through the field, the leveling discs 28 are driven to rotate, thereby sizing soil clods, leveling the soil surface, smoothing the soil surface, and/or cutting residue on the soil surface.

In the illustrated embodiment, the agricultural implement 10 includes a downforce actuator 22 configured to control a downforce applied by the leveling discs 28 to the soil 14. The downforce actuator 22 extends from the implement frame 16 to a leveling disc frame 23, which is pivotally coupled to the implement frame 16. As discussed in detail below, the hydraulic system 12 is fluidly coupled to the actuator 22 and configured to control the actuator 22 during operation of the agricultural implement 10, thereby controlling the downforce applied by the leveling discs 28 to the soil 14. In certain embodiments, the hydraulic system 12 includes a supply conduit configured to provide fluid (e.g., hydraulic fluid) to the actuator 22 and a return conduit configured to return the fluid to a reservoir.

While a single actuator 22 is controlled by the hydraulic system 12 in the illustrated embodiment, in other embodiments, the agricultural implement 10 may include more actuators controlled by the hydraulic system 12. For example, in certain embodiments, the downforce applied by at least one disc blade and/or a soil engagement force applied by at least one tillage point may be controlled by a respective actuator. In such embodiments, the actuator(s) may be controlled by the hydraulic system 12. Furthermore, while the illustrated agricultural implement includes the disc blades 24, the tillage point assemblies 26, and the leveling discs 28, in other embodiments, the agricultural implement may include other and/or additional ground engaging tools, such as finishing reels configured to size clods and/or smooth the field surface (e.g., in which at least one other/ additional ground engaging tool is controlled by an actuator fluidly coupled to the hydraulic system). In addition, while the hydraulic system 12 described herein is used to control the downforce applied by the leveling discs 28, in other embodiments, the hydraulic system may be utilized to control the position of the leveling discs, the force applied by other ground engaging tool(s) of the agricultural implement, the position of other ground engaging tool(s) of the agricultural implement, or a combination thereof. Furthermore, in certain embodiments, the hydraulic system may be utilized to control the force applied by/position of at least one ground engaging tool of another suitable implement (e.g., a planting implement, a seeding implement, a harvesting implement, etc.).

Figure 2:
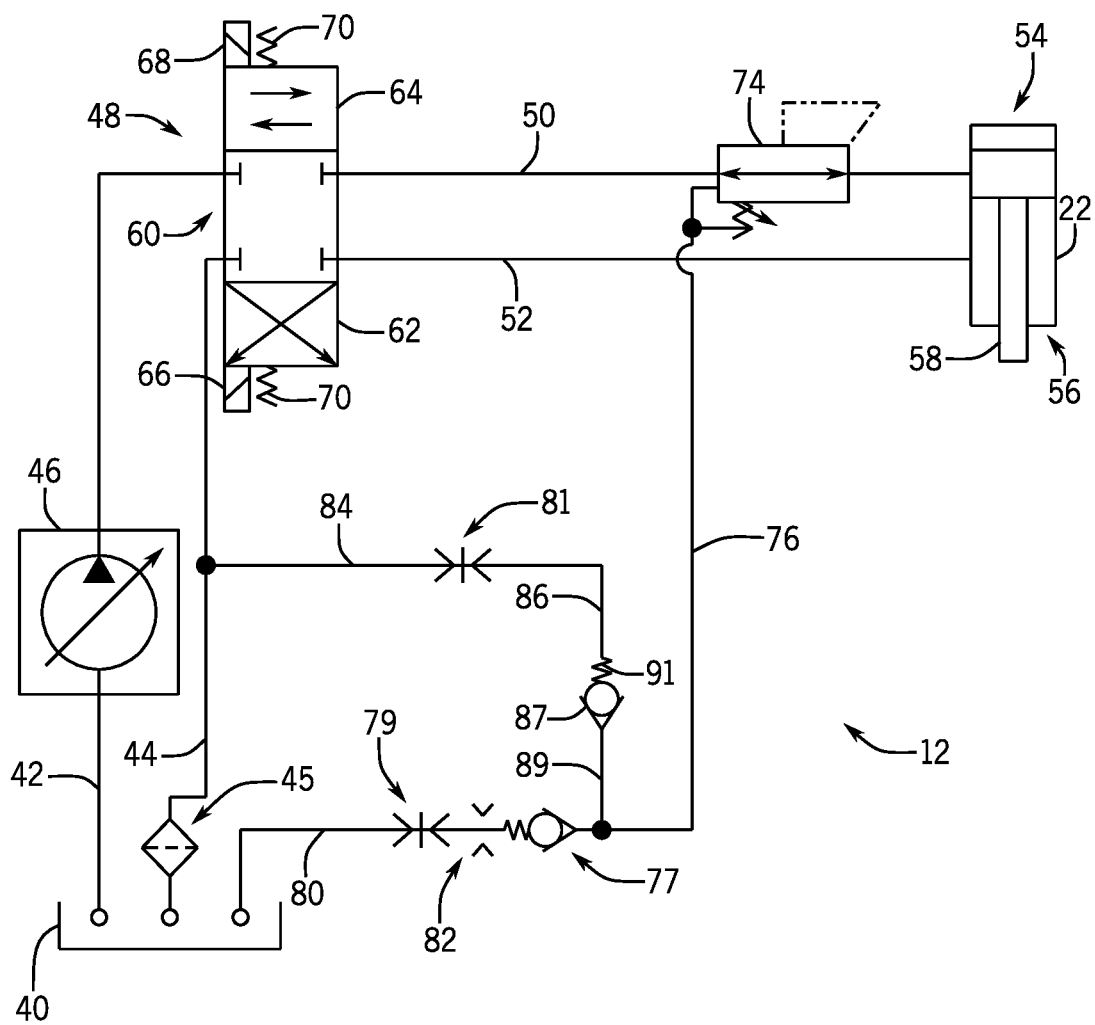
FIG. 2 is a schematic diagram of an embodiment of a hydraulic system that may be employed to control actuator(s) of the agricultural implement of FIG. 1.

FIG. 2 is a schematic diagram of an embodiment of a hydraulic system 12 that may be employed to control actuator(s) of the agricultural implement of FIG. 1. In the illustrated embodiment, the implement hydraulic system 12 is configured to control the downforce applied by the leveling discs 28 to the soil 14. However, in other embodiments, the hydraulic system 12 may control the position of the leveling discs 28 relative to the soil 14, or the hydraulic system 12 may control the force applied by/position of another suitable ground engaging tool.

In the illustrated embodiment, the hydraulic system 12 includes a supply conduit 42 configured to receive fluid (e.g., hydraulic fluid) from a reservoir 40, disposed on the work vehicle. The hydraulic system 12 also includes a return conduit 44 configured to return the fluid to the reservoir 40, disposed on the work vehicle. In addition, the hydraulic system 12 includes a pump 46 (e.g., hydraulic pump) disposed on the work vehicle, and the reservoir (e.g., including a hydraulic fluid tank) is disposed on the work vehicle. The pump 46 is fluidly coupled to the reservoir 40 and configured to circulate hydraulic fluid through the hydraulic system 12.

Furthermore, the hydraulic system 12 includes a cylinder control valve 48 fluidly coupled to the supply conduit 42 and the return conduit 44. The cylinder control valve 48 is also fluidly coupled to a first cylinder conduit 50 and a second cylinder conduit 52 that are disposed on the implement. In the illustrated embodiment, the first cylinder conduit 50 is fluidly coupled to a pressure regulator 74 and a cylinder cap end 54 (e.g., first end) of the actuator 22 (e.g., double-acting cylinder), and the second cylinder conduit 52 is fluidly coupled to a rod end 56 (e.g., second end) of the actuator 22 (e.g., double-acting cylinder). The pressure regulator 74, which is discussed in more detail below, enables fluid to flow through the first cylinder conduit 50 and blocks fluid flow from the first cylinder conduit 50 to the auxiliary conduit 76 while the fluid pressure within the first cylinder conduit 50 on the cylinder side of the pressure regulator 74 (e.g., within the cylinder cap end 54) is less than or equal to a threshold pressure. Providing fluid to the cylinder cap end 54 of the actuator 22 drives a piston rod 58 to extend and providing fluid to the rod end 56 of the actuator 22 drives the piston rod 58 to retract. In the illustrated embodiment, extension of the piston rod 58 increases the downforce applied by the leveling discs (e.g., driving the leveling discs into the ground), and retraction of the piston rod 58 reduces the downforce applied by the leveling discs. However, in other embodiments, extension of the piston rod may reduce the downforce, and retraction of the piston rod may increase the downforce. In such embodiments, the first cylinder conduit 50 may be fluidly coupled to the pressure regulator 74 and to the rod end (e.g., first end) of the actuator, and the second cylinder conduit 52 may be coupled to the cap end (e.g., second end) of the actuator. While the actuator 22 is a double actuating cylinder in the illustrated embodiment, in other embodiments, the actuator may be a single actuating cylinder. In such embodiments, the second cylinder conduit may be omitted, and the cylinder control valve may be configured to control fluid flow through the first cylinder conduit to the single actuating cylinder (e.g., to the cap end of the single actuating cylinder).

Furthermore, in certain embodiments, multiple actuators may be utilized to control the downforce applied to the leveling discs. In such embodiments, the actuators may be fluidly coupled to one another in a series arrangement, in a parallel arrangement, in another suitable arrangement, or a combination thereof. In addition, in certain embodiments, actuator(s) configured to control the downforce applied by other ground engaging tool(s) may be arranged in series or parallel with the illustrated leveling disc downforce cylinder. While the illustrated actuator 22 is configured to control the downforce applied by the leveling discs, in other embodiments, the actuator may be configured to control the downforce applied by other suitable ground engaging tool(s) (e.g., disc blade(s), one or more tillage point assemblies, etc.).

In the illustrated embodiment, the cylinder control valve 48 is a proportional three position/four way valve. The first position 60 of the cylinder control valve 48 is configured to block fluid flow between the supply conduit 42 and the first and second cylinder conduits and between the return conduit 44 and the first and second cylinder conduits, thereby blocking fluid flow between the supply conduit 42 and both ends of the actuator 22 and between the return conduit 44 and both ends of the actuator 22. The second position 62 of the cylinder control valve 48 is configured to facilitate fluid flow between the supply conduit 42 and the rod end 56 of the actuator 22 (e.g., via the second cylinder conduit 52) and between the return conduit 44 and the cylinder cap end 54 of the actuator 22 (e.g., via the first cylinder conduit 50) to drive the actuator 22 to reduce the downforce applied by the leveling discs to the soil. The third position 64 of the cylinder control valve 48 is configured to facilitate fluid flow between the supply conduit 42 and the cylinder cap end 54 of the actuator 22 and between the return conduit 44 and the rod end 56 of the actuator 22 to drive the actuator 22 to increase the downforce applied by the leveling discs to the soil surface. In the illustrated embodiment, the cylinder control valve 48 is a proportional control valve configured to control the fluid flow rate through the valve (e.g., based on the position of the valve relative to the first position). However, in other embodiments, the cylinder control valve may be another suitable type of valve configured to control fluid flow between the supply and return conduits and the actuator.

In the illustrated embodiment, the cylinder control valve 48 includes a retract actuator 66 configured to drive the cylinder control valve 48 to the second position 62. And, the cylinder control valve 48 includes an extend actuator 68 configured to drive the cylinder control valve 48 to the third position 64. In the illustrated embodiment, the retract actuator 66 and the extend actuator 68 are electronic actuators (e.g., solenoids) configured to move the cylinder control valve 48 in response to receiving an electrical signal. In addition, the cylinder control valve 48 includes biasing elements 70 (e.g., springs) configured to urge the cylinder control valve 48 toward the first position 60. Accordingly, applying an electrical signal to the retract actuator 66 drives the cylinder control valve 48 to the second position 62, thereby causing the actuator 22 to reduce the downforce applied by the leveling discs to the soil. Furthermore, applying an electrical signal to the extend actuator 68 drives the cylinder control valve 48 to the third position 64, thereby causing the actuator 22 to increase the downforce applied by the leveling discs to the soil. Furthermore, if no electrical signal is applied to either actuator, the biasing elements 70 drive the cylinder control valve 48 to the first position 60, thereby blocking fluid flow between the supply and return conduits and the actuator 22.

In the illustrated embodiment, the pressure regulator 74 is fluidly coupled to the first cylinder conduit 50, to the cylinder cap end 54 via the first cylinder conduit 50, and to an auxiliary conduit 76 disposed on the implement. As previously mentioned, the pressure regulator 74 enables fluid to flow through the first cylinder conduit 50 to the cap end 54 and blocks fluid flow from the first cylinder conduit 50 (e.g., from the cylinder cap end 54) to the auxiliary conduit 76 while the fluid pressure within the first cylinder conduit 50 on the cylinder side of the pressure regulator 74 (e.g., within the cylinder cap end 54) is less than or equal to a threshold pressure. However, if the fluid pressure within the first cylinder conduit 50 on the cylinder side of the pressure regulator 74 (e.g., within cylinder cap end 54) exceeds the threshold pressure, the pressure regulator 74 provides relief such that it enables fluid to flow through the auxiliary conduit 76 such that the pressure within the first cylinder conduit 50 on the cylinder side of the pressure regulator 74 (e.g., within cylinder cap end 54) is reduced to the threshold pressure. As discussed in detail below, the auxiliary conduit 76 is configured to flow fluid to the reservoir 40. While the hydraulic system includes the pressure regulator 74 in the illustrated embodiment, in other embodiments, the pressure regulator 74 may be replaced with another suitable valve/valve assembly configured to direct fluid through the auxiliary conduit 76 in response to the fluid pressure within the first cylinder conduit 50 (e.g., within cylinder cap end 54) exceeding the threshold pressure.

The hydraulic system 12 further includes a case drain conduit 80 disposed on the work vehicle that returns the fluid to the reservoir 40. In the illustrated embodiment, the case drain conduit 80 is fluidly coupled to the auxiliary conduit 76. Accordingly, in response to the fluid pressure within the first cylinder conduit 50 on the cylinder side of the pressure regulator 74 (e.g., within cylinder cap end 54) exceeding the threshold pressure, the pressure regulator 74 enables fluid to flow through the auxiliary conduit 76 to the case drain conduit 80, which directs the fluid to the reservoir 40. In some embodiments, a flow restrictor 82 (e.g., an orifice, a hose having a selected diameter, etc.) may be disposed along the auxiliary conduit 76 and configured to restrict flow through the auxiliary conduit 76. In some embodiments, a relieving valve 77 may be disposed along the auxiliary conduit 76 and configured to establish a minimum pressure in the auxiliary conduit 76 and block reverse flow from the reservoir 40. In the illustrated embodiment, the case drain conduit 80 and the auxiliary conduit 76 may be coupled via a coupler 79 that is downstream from the flow restrictor 82 and/or the relieving valve 77.

The case drain conduit 80 may provide a low pressure drain for fluid during steady-state operations. For example, the case drain conduit 80 may be able to flow fluid at 1 liter per minute (LPM), 5 LPM, 10 LPM, 20 LPM, 25 LPM, 30 LPM, 35 LPM, 40 LPM, or 50 LPM. The case drain conduit 80 may be able to maintain the flow rate up to a maximum backpressure. For example, the maximum backpressure may be 25 kilopascals (KPA), 50 KPA, 75 KPA, 100 KPA, 125 KPA, or 150 KPA. During normal operation of the implement, the cylinder control valve 48 may be in the third position 64, thereby directing fluid to the cylinder cap end 54 of the actuator 22. If the leveling discs encounters an obstruction within the field, the leveling discs may apply a significant force to the piston rod 58. As a result, the fluid pressure within the cylinder cap end 54 of the actuator 22 and within the first cylinder conduit 50 on the cylinder side of the pressure regulator 74 may increase above the threshold pressure. If the fluid pressure within the first cylinder conduit 50 on the cylinder side of the pressure regulator 74 (e.g., within cylinder cap end 54) exceeds the threshold pressure, the pressure regulator 74 enables fluid to flow through the auxiliary conduit 76 and the case drain conduit 80 to the reservoir 40. Accordingly, movement of the piston rod 58 toward the cylinder cap end 54 is enabled, which enables deflection of the leveling discs.

However, during certain interactions between the leveling discs and obstructions within the field, the fluid flow within the auxiliary conduit 76 may exceed the maximum flow capability of the case drain conduit 80. Accordingly, the case drain conduit 80 may not enable sufficient fluid to flow from the cylinder cap end 54 of the actuator 22 to the reservoir 40 to facilitate deflection of the leveling discs. As such, a supplemental conduit 86 is utilized to provide another flow path to the reservoir 40, thereby enabling fluid to flow to the reservoir 40 while the fluid pressure within the auxiliary conduit 76 exceeds the maximum flow limit of the case drain conduit 80. As a result, the hydraulic system 12 may enable the leveling discs to deflect during more energetic encounters with obstructions.

In the illustrated embodiment, the supplemental conduit 86 is fluidly coupled to the auxiliary conduit 76, which are disposed on the implement, and to a power beyond return conduit 84, which is disposed on the work vehicle. The supplemental conduit 86 is fluidly coupled to the auxiliary conduit 76 upstream of the coupler 79, the flow restrictor 82, and the relieving valve 77. The supplemental conduit 86 may be coupled via a coupler 81. The power beyond return conduit 84 is configured to direct large quantities of fluid from a hydraulic motor to the reservoir 40. In some embodiments, the power beyond return conduit 84 may be fluidly coupled to the return conduit 44, such that the power beyond return conduit 84 may direct fluid from the supplemental conduit 86 to the return conduit 44 In some embodiments, the fluid in the return conduit 44 is routed through a return filter 45 or some other pressurized portions of the tractor hydraulic circuit causing the minimum operating pressure of return conduit 44 and power beyond return conduit 84 to be significantly higher than the minimum operating pressure of case drain conduit 80. However, if the flow through auxiliary conduit 76 exceeds the flow limits of case drain conduit 80, the fluid pressure in the auxiliary conduit 76 may rise to a pressure which is higher than the operating pressure in the return conduit 44 and the power beyond return conduit 84. In this situation, flow in excess of the flow capacity of the case drain conduit 80 may bypass through the supplemental conduit 86 and thereby truncate the rise in backpressure in the auxiliary conduit 76. For example, if the fluid pressure within the auxiliary conduit 76 exceeds the fluid pressure in the power beyond return conduit 84, the fluid may flow from the auxiliary conduit 76 through the supplemental conduit 86 to the power beyond return conduit 84 and then to the return conduit 44. The fluid may then flow through the return conduit 44 to the reservoir 40.

In the illustrated embodiment, a check valve 87 is disposed along the supplemental conduit 86. The check valve 87 is configured to block fluid flow through the supplemental conduit 86 from the power beyond return conduit 84 to the auxiliary conduit 76 while the fluid pressure within the supplement conduit 86 on an auxiliary conduit side 89 of the check valve 87 is less than or equal to the fluid pressure within the power beyond return conduit 84/within the supplemental conduit 86 on a reservoir side 91 of the check valve 87. In addition, the check valve 87 is configured to enable fluid flow through the supplemental conduit 86 from the auxiliary conduit 76 to the power beyond return conduit 84 while the fluid pressure within the auxiliary conduit 76/within the supplement conduit 86 on the auxiliary conduit side 89 of the check valve 87 is greater than the fluid pressure within the power beyond return conduit 84/within the supplemental conduit 86 on the reservoir side 91 of the check valve 87. For example, the check valve 87 may remain closed while the fluid pressure within the auxiliary conduit 76 is less than or equal to the minimum backpressure of the power beyond return conduit 84. Accordingly, substantially all of the fluid from the auxiliary conduit 76 may flow through the case drain conduit 80 while the fluid pressure within the auxiliary conduit 76 is less than or equal to the minimum backpressure of the power beyond return 84. However, in response to the fluid pressure within the auxiliary conduit 76 exceeding the minimum backpressure of power beyond return 84, the fluid pressure within the auxiliary conduit 76/within the supplement conduit 86 on the auxiliary conduit side 89 of the check valve 87 may increase (e.g., due to the restriction at the case drain conduit) to become greater than the fluid pressure within the power beyond return conduit 84/within the supplemental conduit 86 on the reservoir side 91 of the check valve 87. Accordingly, the check valve 87 may open so at least a portion of the fluid from the auxiliary conduit flows through the supplemental conduit 86 to the power beyond return conduit 84. The fluid then flows from the power beyond return conduit 84 to the return conduit 44.

Accordingly, the supplemental line 86 is utilized to provide another flow path to the reservoir 40, thereby enabling fluid to flow to the reservoir 40 while the fluid pressure within the auxiliary conduit 76 exceeds the minimum backpressure of the power beyond return conduit 84. As a result, the hydraulic system 12 may enable the leveling discs 28 to deflect during more energetic encounters within obstructions.

Figure 3:
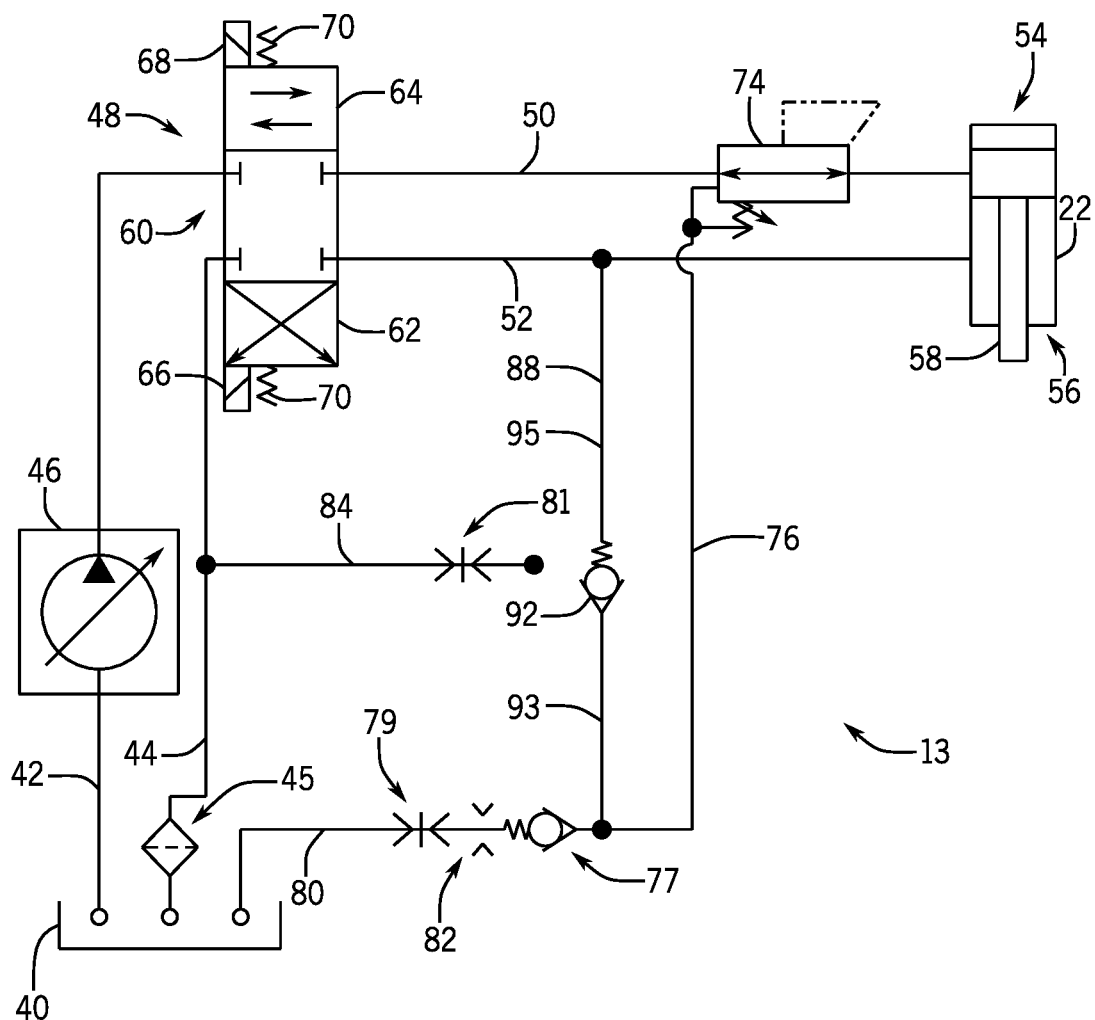
FIG. 3 is a schematic diagram of another embodiment of a hydraulic system that may be employed to control actuator(s) of the agricultural implement of FIGS. 1.

FIG. 3 is a schematic diagram of another embodiment of a hydraulic system 13 that may be employed to control actuator(s) of the agricultural implement of FIG. 1. As previously described, the hydraulic system 13 is configured to control the downforce applied by the leveling discs 28 to the soil 14. However, in other embodiments, the hydraulic system 13 may control the position of the leveling discs 28 relative to the soil 14, or the hydraulic system 13 may control the force applied by/position of another suitable ground engaging tool.

As previously discussed, during normal operation of the implement, the cylinder control valve 48 may be in the third position 64, thereby directing fluid to the cylinder cap end 54 of the actuator 22. In addition, with the cylinder control valve 48 in the third position 64, a fluid connection is established between the second cylinder conduit 52 and the return conduit 44. Accordingly, with the cylinder control valve 48 in the third position 64, fluid may flow from the supplemental conduit 88 to return conduit 44 via the second cylinder conduit 52. The supplemental conduit 88 may be disposed on the implement because it is upstream of the couplers 81 and 79. Additionally or alternatively, in some embodiments, a flow restrictor 82 (e.g., an orifice) and/or a relieving valve 77 may be disposed on the auxiliary conduit 76, downstream from the supplemental conduit 88 and upstream of the coupler 79. The flow restrictor may restrict flow between the auxiliary conduit 76 and the case drain conduit 80 and establish a minimum backpressure on conduit 76. The relieving valve may block reverse flow from reservoir 40 through the auxiliary conduit 76.

Similar to the example given for the description of FIG. 2, during certain interactions between the leveling discs 28 and obstructions within the field, the fluid flow within the auxiliary conduit 76 may exceed the maximum flow limit of the case drain conduit 80. Accordingly, the case drain conduit 80 may not enable sufficient fluid to flow from the cylinder cap end 54 of the actuator 22 to the reservoir 40 to facilitate deflection of the leveling discs. As such, a supplemental conduit 88 is utilized to provide another flow path to the reservoir 40, thereby enabling fluid to flow to the reservoir 40 while the fluid flow within the auxiliary conduit 76 exceeds the maximum flow limit of the case drain conduit 80. As a result, the hydraulic system 13 may enable the leveling discs 28 to deflect during more energetic encounters within obstructions.

In the illustrated embodiment, the supplemental conduit 88 is fluidly coupled to a check valve 92, the auxiliary conduit 76, and to the second cylinder conduit 52. The check valve 92 is disposed along the supplemental conduit 88 and is configured to block fluid flow through the supplemental conduit 88 from the second cylinder conduit 52 to the auxiliary conduit 76 while the fluid pressure within the auxiliary conduit 76/within the supplement conduit 88 on an auxiliary conduit side 93 of the check valve 92 is less than or equal to the fluid pressure within the second cylinder conduit 52/within the supplemental conduit 88 on a reservoir side 95 of the check valve 92. In addition, the check valve 92 is configured to enable fluid flow through the supplemental conduit 88 from the auxiliary conduit 76 to the second cylinder conduit 52 while the fluid pressure within the auxiliary conduit 76/within the supplement conduit 88 on the auxiliary conduit side 93 of the check valve 92 is greater than the fluid pressure within the second cylinder conduit 52/within the supplemental conduit 88 on the reservoir side 95 of the check valve 92. For example, the check valve 92 may remain closed while the fluid pressure within the auxiliary conduit 76 is less than or equal to the minimum pressure of the second cylinder conduit 52. Accordingly, substantially all of the fluid from the auxiliary conduit 76 may flow through the case drain conduit 80 while the fluid pressure within the auxiliary conduit 76 is less than or equal to the minimum operation pressure of cylinder conduit 52. However, in response to the fluid flow within the auxiliary conduit 76 exceeding the flow limitation of case drain conduit 80, the fluid pressure within the auxiliary conduit 76/within the supplement conduit 88 on the auxiliary conduit side 93 of the check valve 92 may increase (e.g., due to the restriction at the case drain conduit 80) to become greater than the fluid pressure within the second cylinder conduit 52/within the supplemental conduit 88 on the reservoir side 95 of the check valve 92. Accordingly, the check valve 92 may open so at least a portion of the fluid from the auxiliary conduit 76 flows through the supplemental conduit 88 to the second cylinder conduit 52. The fluid then flows from the second cylinder conduit 52 to the return conduit 44.

Accordingly, the supplemental line 88 is utilized to provide another flow path to the reservoir 40, thereby enabling fluid to flow to the reservoir 40 while the fluid flow within the auxiliary conduit 76 exceeds the flow limitation of the case drain conduit 80. As a result, the hydraulic system 13 may enable the leveling discs 28 to deflect during more energetic encounters with obstructions.

Figure 4:
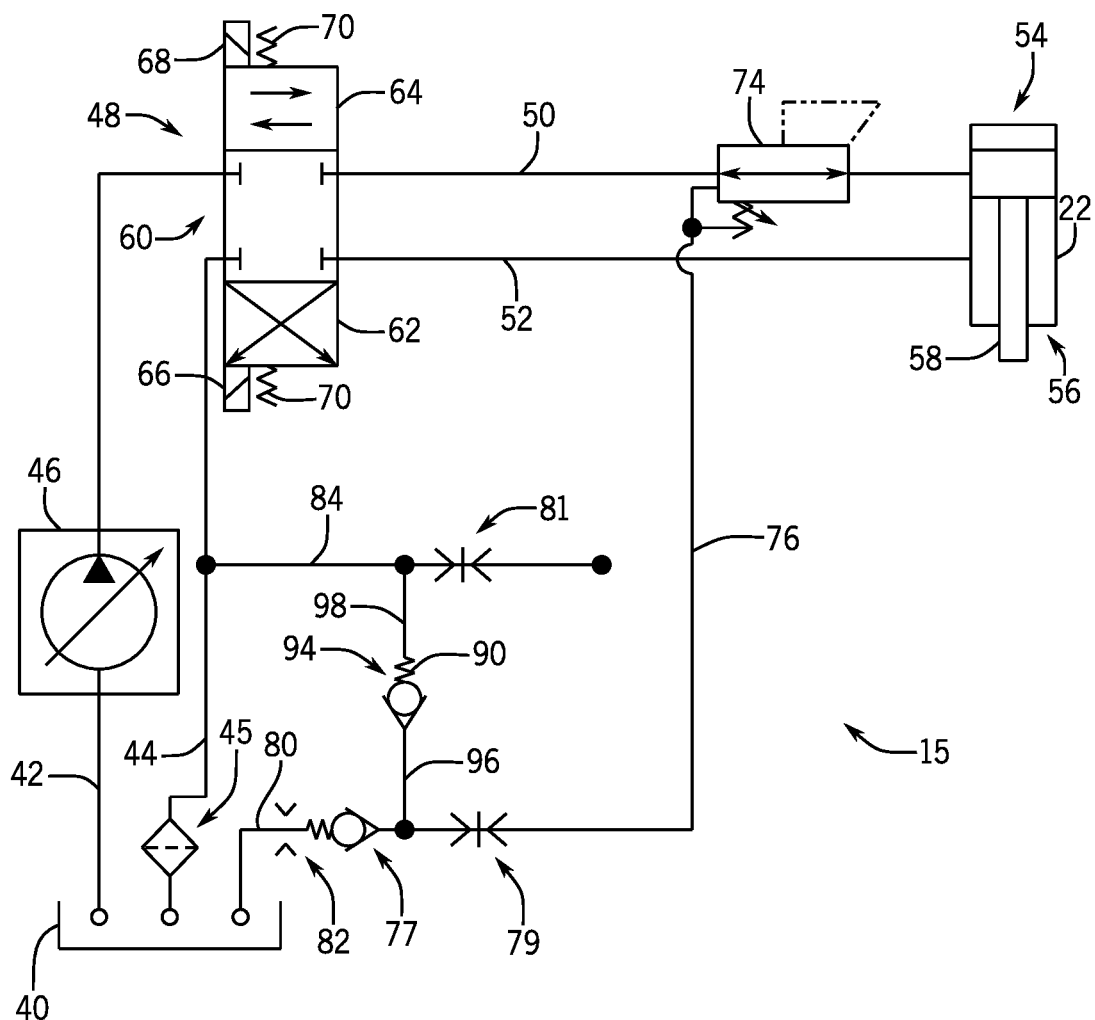
FIG. 4 is a schematic diagram of another embodiment of a hydraulic system that may be employed to control actuator(s) of the agricultural implement of FIG. 1.

FIG. 4 is a schematic diagram of another embodiment of a hydraulic system 15 that may be employed to control actuator(s) of the agricultural implement of FIG. 1. As previously described relative to FIGS. 2 and 3, the implement control system 15 is configured to control the downforce applied by the leveling discs 28 to the soil 14. However, in other embodiments, the hydraulic system 15 may control the position of the leveling discs 28 relative to the soil 14, or the hydraulic system 15 may control the force applied by/position of another suitable ground engaging tool.

Similar to the examples given for in the descriptions of FIGS. 2 and 3, during certain interactions between the leveling discs 28 and obstructions within the field, the fluid flow within the auxiliary conduit 76 may exceed the maximum flow limitation of the case drain conduit 80. Accordingly, the case drain conduit 80 may not enable sufficient fluid to flow from the cylinder cap end 54 of the actuator 22 to the reservoir 40 to facilitate deflection of the leveling discs 28. As such, a supplemental conduit 90 is utilized to provide another flow path to the reservoir 40, thereby enabling fluid to flow to the reservoir 40 while the fluid flow within the auxiliary conduit 76 exceeds the maximum flow limitation of the case drain conduit 80. As a result, the hydraulic system 15 may enable the leveling discs 28 to deflect during more energetic encounters within obstructions.

In the illustrated embodiment, the supplemental conduit 90 may fluidly couple to the case drain conduit 80 downstream of the coupler 79. The supplemental conduit 90 may fluidly couple to the case drain conduit 84 downstream of the coupler 81. The supplemental conduit 90 may be within the work vehicle because it is downstream of the couplers 81 and 79. Additionally or alternatively, in some embodiments, the flow restrictor 82 (e.g., an orifice) and/or the relieving valve 77 may be disposed on the case drain conduit 80 downstream from the connection between then case drain conduit 80 and the supplemental conduit 90. The flow restrictor may restrict flow from the case drain conduit 80 and to the reservoir 40.

In the illustrated embodiment, the supplemental conduit 90 is fluidly coupled to a check valve 94, the case drain conduit 80, and the power beyond return conduit 84. The check valve 94 is disposed along the supplemental conduit 90 and is configured to block fluid flow through the supplemental conduit 90 from the power beyond return conduit 84 to case drain conduit 80 while the fluid pressure within the case drain conduit 80/within the supplement conduit 90 on an auxiliary conduit side 96 of the check valve 94 is less than or equal to the fluid pressure within the power beyond return conduit 84/within the supplemental conduit 90 on a reservoir side 98 of the check valve 94. In addition, the check valve 94 is configured to enable fluid flow through the supplemental conduit 90 from the case drain conduit 80 to the power beyond return conduit 84 while the fluid pressure within the case drain conduit 80/within the supplement conduit 90 on the auxiliary conduit side 96 of the check valve 94 is greater than the fluid pressure within the power beyond return conduit 84/within the supplemental conduit 90 on the reservoir side 98 of the check valve 94. For example, the check valve 94 may remain closed while the fluid pressure within the case drain conduit 80 is less than or equal to the minimum pressure of the power beyond return conduit 84. Accordingly, substantially all of the fluid from the auxiliary conduit 76 may flow through the case drain conduit 80 while the fluid pressure within the auxiliary conduit 76 is less than or equal to the minimum pressure of power beyond return conduit 84. However, in response to the fluid flow within the auxiliary conduit 76 exceeding the maximum flow limitation of conduit 80, the fluid pressure within the case drain conduit 80/within the supplement conduit 90 on the auxiliary conduit side 96 of the check valve 94 may increase (e.g., due to the restriction at the case drain conduit 80) to become greater than the fluid pressure within the power beyond return conduit 84/within the supplemental conduit 90 on the reservoir side 98 of the check valve 94. Accordingly, the check valve 94 may open so at least a portion of the fluid from the case drain conduit 80 flows through the supplemental conduit 90 to the power beyond return conduit 84. The fluid then flows from the power beyond return conduit 84 to the return conduit 44.

Accordingly, the supplemental line 90 is utilized to provide another flow path to the reservoir 40, thereby enabling fluid to flow to the reservoir 40 while the fluid flow within the auxiliary conduit 76 exceeds the maximum flow limitation of the case drain conduit 80. As a result, the hydraulic system 15 may enable the leveling discs 28 to deflect during more energetic encounters within obstructions.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hydraulic system comprising:
a first cylinder conduit configured to fluidly couple to a cylinder;
an auxiliary conduit configured to fluidly couple to a case drain conduit configured to direct fluid to a reservoir;
a pressure regulator fluidly coupled to the first cylinder conduit and to the auxiliary conduit, wherein the pressure regulator is configured to block fluid flow to the auxiliary conduit while a first fluid pressure within the first cylinder conduit on a cylinder side of the pressure regulator is less than or equal to a threshold pressure, and the pressure regulator is configured to enable fluid flow to the auxiliary conduit while the first fluid pressure within the first cylinder conduit on the cylinder side of the pressure regulator is greater than the threshold pressure;
a supplemental conduit configured to direct the fluid from the auxiliary conduit to the reservoir; and
a check valve disposed along the supplemental conduit, wherein the check valve is configured to close to block fluid flow through the supplemental conduit to the auxiliary conduit while a second fluid pressure within the supplemental conduit on an auxiliary conduit side of the check valve is less than or equal to a third fluid pressure within the supplemental conduit on a reservoir side of the check valve, and the check valve is configured to open to enable fluid flow through the supplemental conduit to the reservoir while the second fluid pressure within the supplemental conduit on the auxiliary conduit side of the check valve is greater than the third fluid pressure within the supplemental conduit on the reservoir side of the check valve;
wherein the auxiliary conduit is configured to enable the fluid to flow to the reservoir via the case drain conduit while the check valve is closed.

2. The hydraulic system of claim 1, wherein the supplemental conduit is fluidly coupled to the auxiliary conduit and configured to fluidly couple to a power beyond return conduit, and the power beyond return conduit is configured to direct the fluid to the reservoir.

3. The hydraulic system of claim 2, comprising a restrictor, a relieving valve, or a combination thereof, disposed along the auxiliary conduit downstream from the supplemental conduit.

4. The hydraulic system of claim 2, comprising a coupler configured to fluidly couple the auxiliary conduit and the case drain conduit, wherein the coupler is disposed downstream from the supplemental conduit.

5. The hydraulic system of claim 1, comprising a second cylinder conduit configured to fluidly couple to the cylinder, wherein the supplemental conduit is fluidly coupled to the second cylinder conduit and to the auxiliary conduit.

6. The hydraulic system of claim 5, comprising a restrictor, a relieving valve, or a combination thereof, disposed along the auxiliary conduit downstream from the supplemental conduit.

7. The hydraulic system of claim 1, comprising a cylinder control valve fluidly coupled to the first cylinder conduit and configured to control fluid flow to the cylinder, from the cylinder, or a combination thereof.

8. The hydraulic system of claim 1, comprising the case drain conduit, wherein the supplemental conduit is fluidly coupled to a power beyond return conduit and to the case drain conduit, and the power beyond return conduit is configured to direct the fluid to the reservoir.

9. The hydraulic system of claim 8, comprising a relieving valve, a restrictor, or a combination thereof, disposed along the case drain conduit downstream from the supplemental conduit.

10. The hydraulic system of claim 8, comprising a coupler configured to fluidly couple the case drain conduit and the auxiliary conduit, wherein the coupler is disposed upstream of the supplemental conduit.

11. A hydraulic system, comprising:
a first cylinder conduit;
a second cylinder conduit;
a cylinder fluidly coupled to the first cylinder conduit and the second cylinder conduit;
an auxiliary conduit configured to fluidly couple to a case drain conduit configured to direct fluid to a reservoir;
a supplemental conduit fluidly coupled to the auxiliary conduit and to the second cylinder conduit;
a pressure regulator fluidly coupled to the first cylinder conduit and to the auxiliary conduit, wherein the pressure regulator is configured to block fluid flow to the auxiliary conduit while a first fluid pressure within the first cylinder conduit on a cylinder side of the pressure regulator is less than or equal to a threshold pressure, and the pressure regulator is configured to enable fluid flow to the auxiliary conduit while the first fluid pressure within the first cylinder conduit on the cylinder side of the pressure regulator is greater than the threshold pressure; and a check valve disposed along the supplemental conduit, wherein the check valve is configured to close to block fluid flow through the supplemental conduit while a second fluid pressure within the supplemental conduit on an auxiliary conduit side of the check valve is less than or equal to a third fluid pressure within the supplemental conduit on a second cylinder conduit side of the check valve, and the check valve is configured to open to enable fluid flow through the supplemental conduit to the second cylinder conduit while the second fluid pressure within the supplemental conduit on the auxiliary conduit side of the check valve is greater than the third fluid pressure within the supplemental conduit on the second cylinder conduit side of the check valve;

wherein the auxiliary conduit is configured to enable the fluid to flow to the reservoir via the case drain conduit while the check valve is closed.

12. The hydraulic system of claim 11, comprising a coupler configured to fluidly couple the case drain conduit and the auxiliary conduit, wherein the supplemental conduit is upstream of the coupler.

13. The hydraulic system of claim 12, comprising a relieving valve, a restrictor, or a combination thereof, disposed along the auxiliary conduit downstream from the supplemental conduit and upstream of the coupler.

14. A hydraulic system comprising:
a power beyond return conduit configured to direct fluid to a reservoir;
a first cylinder conduit;
a cylinder fluidly coupled to the first cylinder conduit;
a case drain conduit configured to direct the fluid to the reservoir;
an auxiliary conduit configured to fluidly couple to the case drain conduit;
a pressure regulator fluidly coupled to the first cylinder conduit and to the auxiliary conduit, wherein the pressure regulator is configured to block fluid flow to the auxiliary conduit while a first fluid pressure within the first cylinder conduit on a cylinder side of the pressure regulator is less than or equal to a threshold pressure, and the pressure regulator is configured to enable fluid flow to the auxiliary conduit while the first fluid pressure within the first cylinder conduit on the cylinder side of the pressure regulator is greater than the threshold pressure;

a supplemental conduit fluidly coupled to the power beyond return conduit and to a connection conduit, wherein the connection conduit is one of the auxiliary conduit or the case drain conduit; and a check valve disposed along the supplemental conduit, wherein the check valve is configured to close to block fluid flow through the supplemental conduit while a second fluid pressure within the supplemental conduit on a connection conduit side of the check valve is less than or equal to a third fluid pressure within the supplemental conduit on a power beyond return conduit side of the check valve, and the check valve is configured to open to enable fluid flow through the supplemental conduit to the power beyond return conduit while the second fluid pressure within the supplemental conduit on the connection conduit side of the check valve is greater than the third fluid pressure within the supplemental conduit on the power beyond return conduit side of the check valve;

wherein the auxiliary conduit is configured to enable the fluid to flow to the reservoir via the case drain conduit while the check valve is closed.

15. The hydraulic system of claim 14, wherein the connection conduit is the auxiliary conduit and the supplemental conduit is coupled to the auxiliary conduit upstream of a first coupler configured to couple the auxiliary conduit and the case drain conduit.

16. The hydraulic system of claim 15, comprising a relieving valve, a restrictor, or a combination thereof, disposed along the auxiliary conduit downstream from the supplemental conduit and upstream of the first coupler.

17. The hydraulic system of claim 15, wherein the supplemental conduit is coupled to the power beyond return conduit upstream of a second coupler.

18. The hydraulic system of claim 14, wherein the connection conduit is the case drain conduit and the supplemental conduit is coupled to the case drain conduit downstream of a coupler configured to couple the auxiliary conduit and the case drain conduit.

19. The hydraulic system of claim 18, comprising a relieving valve, a restrictor, or a combination thereof, disposed along the case drain conduit downstream from the supplemental conduit.

* * * * *